US012729869B2

(12) United States Patent
Mitchell et al.

(10) Patent No.: US 12,729,869 B2
(45) Date of Patent: Sep. 8, 2026

(54) WRITE ACCESS SECURITY PROTOCOL FOR HEATING, VENTILATION, AND/OR AIR-CONDITIONING (HVAC) DEVICE

(71) Applicant: Johnson Controls Tyco IP Holdings LLP, Milwaukee, WI (US)

(72) Inventors: Shelby Mitchell, Pittsburg, KS (US); Shaun Bradley Atchison, Kansas City, MO (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 451 days.

(21) Appl. No.: 18/195,693

(22) Filed: May 10, 2023

(65) Prior Publication Data

US 2024/0377091 A1 Nov. 14, 2024

(51) Int. Cl.
*F24F 11/63* (2018.01)
*G06F 21/31* (2013.01)

(52) U.S. Cl.
CPC .............. *F24F 11/63* (2018.01); *G06F 21/31* (2013.01)

(58) Field of Classification Search
CPC ................................ F24F 11/63; G06F 21/31
USPC .......................................................... 700/276
See application file for complete search history.

(56) References Cited

U.S. PATENT DOCUMENTS

| | | | | |
|---|---|---|---|---|
| 6,321,165 | B1 | 11/2001 | Ohta et al. | |
| 7,222,800 | B2 | 5/2007 | Wruck | |
| 10,928,088 | B2 | 2/2021 | Atchison et al. | |
| 11,147,145 | B2 | 10/2021 | Haverlag et al. | |
| 2010/0091686 | A1 | 4/2010 | Rutjes et al. | |
| 2011/0119476 | A1 | 5/2011 | Dai | |
| 2014/0031991 | A1* | 1/2014 | Bergman | G05D 23/1905 709/228 |
| 2016/0119430 | A1* | 4/2016 | Mighdoll | H04L 67/125 709/225 |
| 2018/0158315 | A1* | 6/2018 | Sloo | G01N 33/004 |
| 2020/0074821 | A1* | 3/2020 | Horgan | G08B 29/22 |
| 2020/0342080 | A1* | 10/2020 | Mousavi | G06F 21/35 |
| 2021/0345100 | A1* | 11/2021 | Smirnova | H04W 12/04 |
| 2025/0053631 | A1* | 2/2025 | Okabe | G06V 40/172 |

FOREIGN PATENT DOCUMENTS

WO 2017218300 A1 12/2017

* cited by examiner

*Primary Examiner* — Md Azad
(74) *Attorney, Agent, or Firm* — Fletcher Yoder, P.C.

(57) ABSTRACT

The present disclosure includes a heating, ventilation, and/or air-conditioning (HVAC) control system with a controller and a device communicatively coupled to the controller. The device is configured to implement an engagement protocol, wherein to grant the controller write access to protected registers of the device the engagement protocol functions to require: receiving a reset command at a reset register of the device; receiving a passcode at a passcode register of the device; matching the passcode received at the passcode register to an authentication passcode; and receiving or matching the passcode within a timeframe defined by a timer.

19 Claims, 4 Drawing Sheets

WRITE ACCESS SECURITY PROTOCOL FOR HEATING, VENTILATION, AND/OR AIR-CONDITIONING (HVAC) DEVICE

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure generally relates to equipment such as heating, ventilation, and/or air conditioning (HVAC) systems and, more particularly, to a control system that may be implemented in such equipment. An HVAC system generally includes a control system to control and/or to coordinate operation of devices, such as motors and sensors. A control system may include a controller, such as an industrial controller (e.g., a programmable logic controller), a computer (e.g., a laptop or desktop computer), a smart device (e.g., a smart phone or tablet), or the like. Further, a control system may include or at least network with one or more devices, which may include device boards (e.g., a printed circuit board coupled to a temperature sensor). In operation, the control system may facilitate communication of information (e.g., sensor data and control commands) between one or more controllers and one or more devices in a system. To facilitate communication, the control system may send and/or receive data according to a specific communication protocol, which may govern parameters such as a data transmission rate and/or checksum data. However, in some instances, different devices use different communication protocols. That is, for example, a first device provided by a first manufacturer may utilize one communication protocol, while a second device provided by a second manufacturer may utilize a second and different communication protocol. It is now recognized that it is desirable to provide security measures to avoid undesired adjustments to the control system and related devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment of the present disclosure, a heating, ventilation, and/or air-conditioning (HVAC) control system includes a controller and a device communicatively coupled to the controller. The device is configured to implement an engagement protocol, wherein to grant the controller write access to protected registers of the device the engagement protocol functions to require: receiving a reset command at a reset register of the device; receiving a passcode at a passcode register of the device; matching the passcode received at the passcode register to an authentication passcode; and receiving or matching the passcode within a timeframe defined by a timer.

In an embodiment of the present disclosure, a tangible, non-transitory, computer-readable medium stores instructions that, when executed by one or more processors, cause the one or more processors to implement an engagement protocol. To grant the controller write access to protected registers of the device, the engagement protocol operates to require: receiving a reset command at a reset register of the device; receiving a passcode at a passcode register of the device; matching the passcode received at the passcode register to an authentication passcode; and receiving or matching the passcode within a timeframe defined by a timer.

In an embodiment of the present disclosure, a method of operating a heating, ventilation, and air-conditioning (HVAC) control system includes performing an engagement protocol to control write access to protected registers of a device. Operation of the engagement protocol includes receiving a reset command at a reset register of the device and completing a reset of the device in response to the reset command. Further operation of the engagement protocol includes, after completing the reset, receiving a passcode at a passcode register of the device, matching the passcode received at the passcode register to an authentication passcode, and receiving or matching the passcode within a timeframe defined by a timer.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
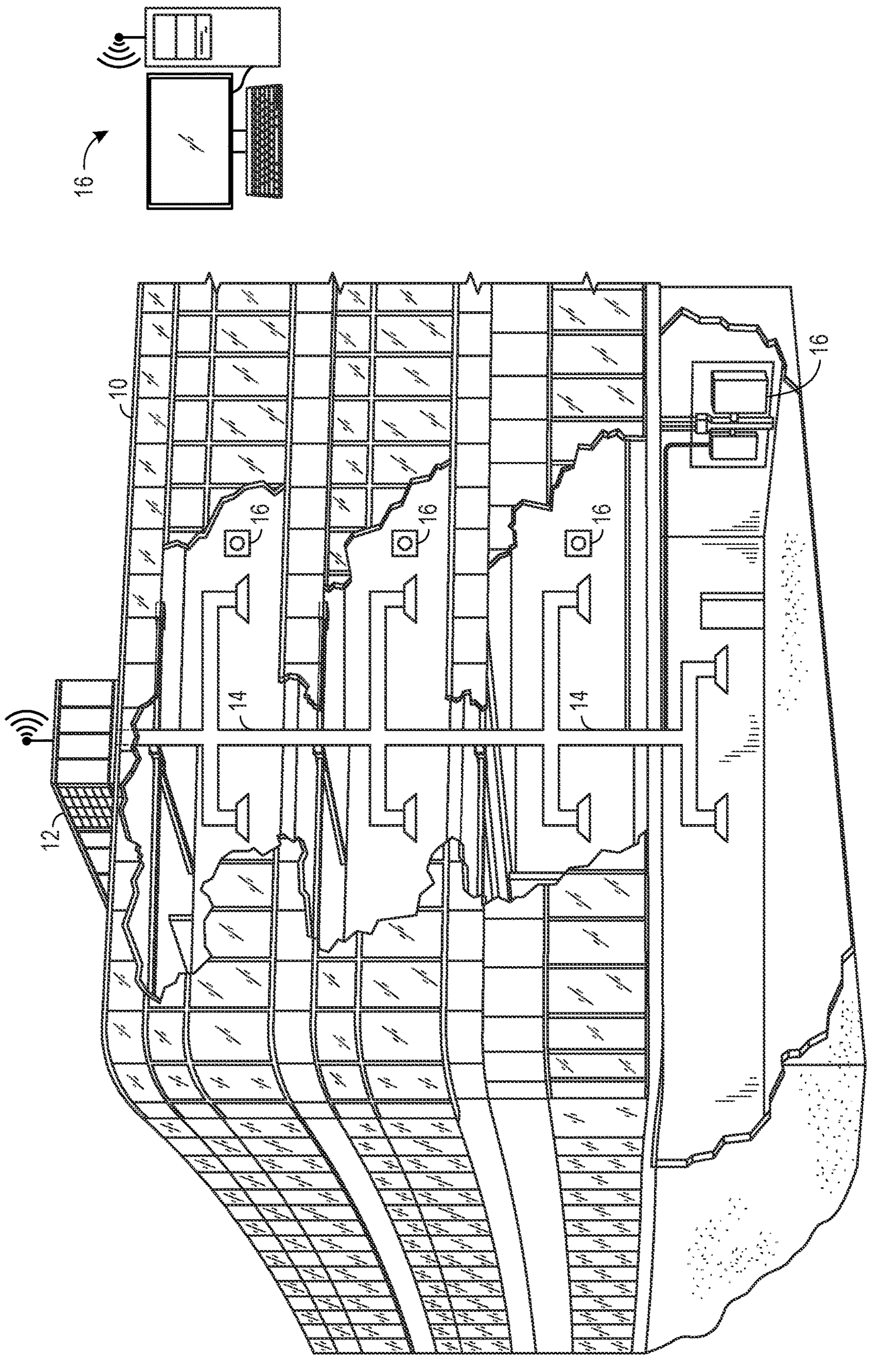
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles “a,” “an,” and “the” are intended to mean that there are one or more of the elements. The terms “comprising,” “including,” and “having” are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below equipment systems, such as heating, ventilation, and air conditioning (HVAC) systems often utilize a control system to control the operation of devices or equipment within the system. Such control systems may be implemented via one or more controllers (e.g., control boards or panels). A control board may receive input data or signals from one or more devices in the HVAC system, such as an interface device (e.g., a controller with a graphical user interface), a thermostat, a sensor, another control board, or any combination thereof. Additionally or alternatively, a control board may output control commands or signals that instruct one or more other devices in the HVAC system to perform control actions. For example, a control board (or other controller) may receive a temperature setpoint via a thermostat, compare the temperature setpoint to a temperature measurement received from a temperature sensor, and instruct equipment in the HVAC system to adjust operation when the temperature measurement deviates from the temperature setpoint by more than a threshold amount. As another example, a user may instruct a measurement device (e.g., an air measurement device that includes a sensor integrated with a printed circuit board) to adjust its functionality. Specifically, for example, the measurement device may be instructed to report sensor data in a particular unit of measure (e.g., report temperature in degrees Fahrenheit or Celsius) via inputs to a graphical user interface of a controller (e.g., a local or system level controller), which may in turn be transmitted to and received by the measurement device.

To interface with a device (e.g., a sensor or sensor assembly) in the HVAC system, a controller may communicatively couple (e.g., via direct electrical communication or wireless communication) to the device via an input/output (I/O) port. The device may operate using electrical power with target parameters, such as current, voltage, and/or frequency. The device may also have default operational, reporting, and communication settings, such as settings for communicating data in a particular format or operating in a particular mode. In order to modify operation (e.g., settings) of the device, such as to implement a desired mode of operation, a controller may need to access the device via a specific communication protocol (e.g., a procedure defined by circuitry, software, firmware, ladder logic, or the like), which may be defined by the device. Indeed, the device may be implemented to only communicate with a controller via a specific communication protocol, which may provide limited routes for communication (e.g., limited options for receiving and/or storing data). Indeed, certain protocols and also certain types of device hardware have limited available read and/or write registers. To facilitate communication between the controller and the device, the controller may be implemented to communicate with the device by using the specific communication protocol. Further, in accordance with present embodiments, protocol features may limit an ability to write to the device without proper authorization while also limiting types of input used. This may be done to efficiently utilize available communication capabilities (e.g., read and/or write registers) and to provide security by limiting direct access to devices that employ the protocol. Thus, present embodiments provide write protection and associated security benefits without requiring introduction of a system-level security layer that may require interfacing with various different protocols employed by varying devices throughout the system, which may make such a security layer cumbersome and difficult to maintain.

Accordingly, the present disclosure provides techniques that facilitate improving operational flexibility of a control system to manage devices of an associated system while providing a secured write communication protocol to end users of the system (e.g., HVAC system end users). For example, by enabling a device (e.g., a control board of the device) to confirm access authorization based on limited and fundamental communications, embodiments of the present disclosure provide a secured product with write and read functionality that can also operate within a system having varying different communication protocols. A write access scheme can be applied to several communication protocols such that protocols without native security can be implemented in a secure manner. In this way, present embodiments may support dynamic interchange and reconfiguration of devices that interface with a control system of an HVAC system, which facilitates greater operational flexibility and provides a built-in security mechanism.

Specifically, present embodiments may include two protocol portions: (1) an engagement protocol and (2) an implementation protocol. Devices may implement these protocols based on device programming (e.g., firmware, software, or circuit logic) of circuitry components (e.g., a processor, memory, or other circuitry) of the device. Embodiments may include one or more devices that block write access unless a unique engagement protocol is followed and also prevent implementation of written changes unless a unique implementation protocol is followed. As a specific example, an HVAC system may include an air measurement device, which includes a printed circuit board that operates with a self-heated sensor to detect air temperature and determine airflow measurements using thermal dispersion technology. The printed circuit board and the sensor may coordinate to make calculations related to thermal dispersion and use the results to make the above-referenced measurements of temperature and airflow. It may be desirable to update certain aspects associated with the operation of the air measurement device. For example, area values (e.g., square footage of a measurement area) may need to be updated or it may be desirable to change a unit of measurement for reporting measurement values (e.g., calculated values based on detected data). However, it may also be desirable to confirm that such changes are authorized before receiving and/or implementing them.

Accordingly, present embodiments may require an engagement protocol, which may require a reset of the device (e.g., reset of the air measurement device) followed by receipt (e.g., entry) of a passcode (e.g., a device-specific access key or password) that must be written to the device within a specified timeframe (e.g., within 30 seconds of the reset instruction or a completed reset) before write access is granted for receiving data from a controller requesting such access. The reset followed by an authorized passcode may result in a grant of access to certain writable registers (e.g., memory locations) for a designated amount of time. Prior to granting write access (e.g., to certain registers of the device), write access may only be allowed for a few (and perhaps only one) registers, including a register (which may represent a set of registers) associated with the reset request (which may be referred to as a reset register). Thus, the device is capable of being reset without granting write access to any control or reporting features. However, a reset is required and must be followed by receipt of a proper passcode for the device to provide write authority (i.e., access to write to registers that are not otherwise open for writing). In order to receive the passcode, there is a register that is configured to receive the passcode. The register for receiving the passcode (which may be referred to as a passcode register and may represent a set of registers) may be set to essentially always be writable while the device is powered or may only become writable for a time period after a reset.

By allowing the reset register and the passcode register to be written to as part of the protocol discussed above, present embodiments implement a gate-keeping security function that protects other registers from being written to without authorization. As previously noted, the protocol employed in the access phase of operation may be referred to as an engagement protocol. Present embodiments may also employ an implementation protocol that blocks operational changes that have been written during the access phase but that have not been properly saved. In order to properly save written changes to a device, the device may require receipt of another reset instruction within a second designated time period (e.g., 30 minutes from the reset or from writing). In other words, a limited time (e.g., a new timer or the remains of an old timer) for entering changes may be initiated upon granting access to write functions for certain registers in response to properly completing the engagement protocol. Thus, if changes are not made within a limited amount of time and the device is not reset within that limited amount of time, the changes will not be saved or implemented and the device configuration will revert to a configuration stored prior to write access being enabled for the registers related to configuration of the device.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may include or be part of a split HVAC system, which includes an outdoor HVAC unit and an indoor HVAC unit.

The HVAC unit 12 may include an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A controller 16, one type of which may be a thermostat or computer, may be used to designate the temperature of the conditioned air. The controller 16 may also be used to control the flow of air through the ductwork 14 by instructing actuation of system devices. For example, the controller 16 may be used to regulate operation of one or more components of the HVAC unit 12 or other components of an associated system, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the controller 16 may include computer systems that are integrated with or separate from other building control or monitoring systems, and even systems that are remote from the building 10.

Figure 2:
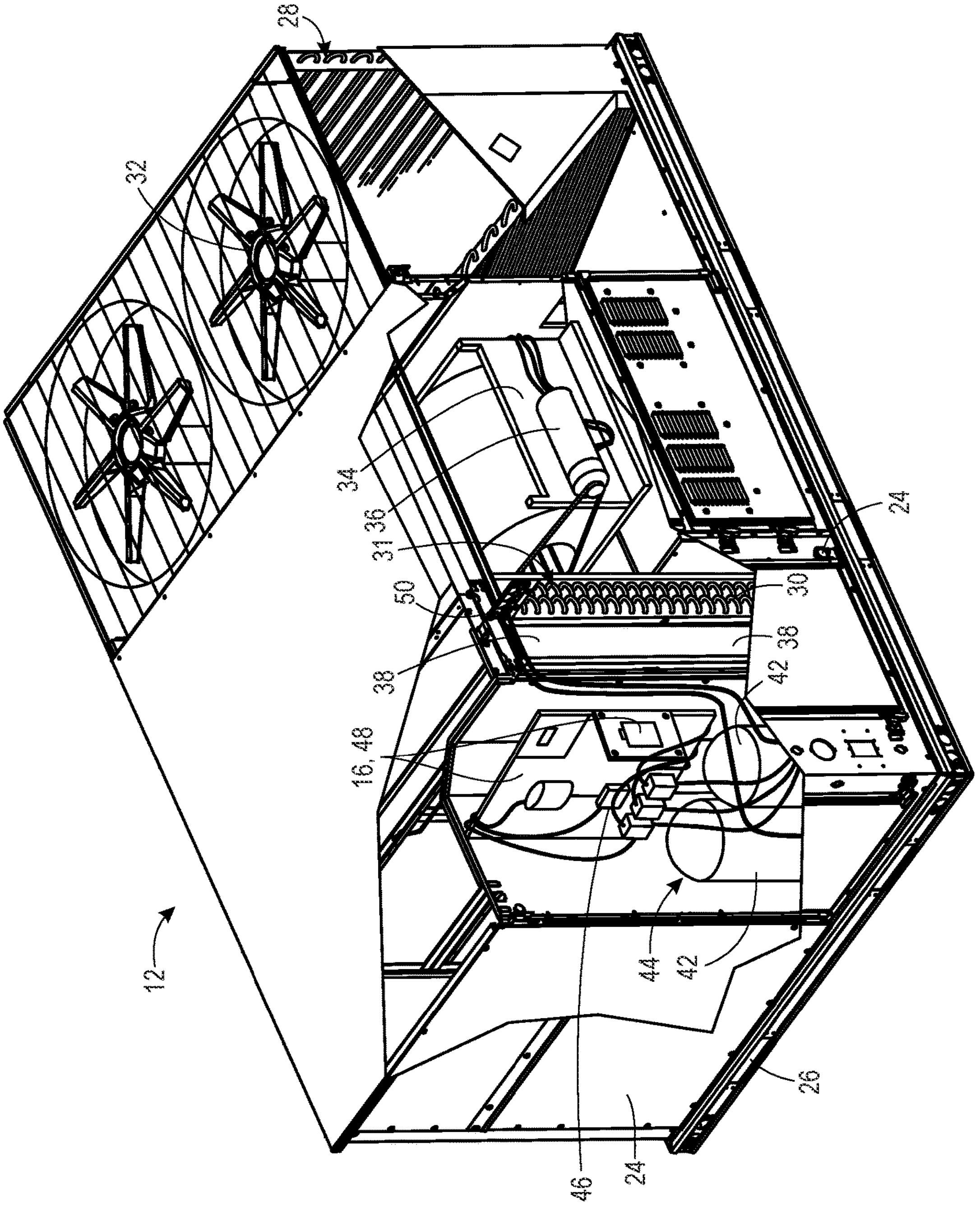
FIG. 2 is a perspective view of a HVAC unit of the HVAC system of FIG. 1, in accordance with an embodiment of the present disclosure.

FIG. 2 is a perspective view of an embodiment of the HVAC unit 12 in accordance with an embodiment of the present disclosure. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things. Such devices may be operable to communicate with the controller 16 in accordance with protocols described herein to protect them from unauthorized write attempts.

The HVAC unit 12 may receive electrical power via a terminal block 46. For example, a high voltage power source may be connected to the terminal block 46 to power the equipment. The operation of the HVAC unit 12 may be governed or regulated by the controller 16, which in the illustrated embodiment includes a control board 48. The controller 16 may include control circuitry connected to various devices (e.g., a thermostat, a sensor, and/or an alarm). The various devices (e.g., humidity sensors) may include controllers with control circuity as well. The control circuitry, which may be part of one or more controllers, may be implemented to monitor devices (e.g., HVAC equipment) of the system to provide status information, measurement data, and so forth. Further, the control circuity of the controller 16 may communicate with devices (e.g., a louver, a sensor, a valve) to control system operations (e.g., adjust a system device to maintain a setting), and also to facilitate provision of notifications (e.g., alarms, measurement values determined using the controllers 16) via an interface (e.g., a speaker, a display, a graphical user interface). Wiring 50 may connect the controller 16 and the terminal block 46 to the equipment (e.g., control devices) of the HVAC unit 12. It should be noted that the various devices (e.g., the blower assembly 34) in the HVAC unit 12 or any HVAC system may separately include respective controllers or control boards (e.g., controller 16) that communicate with each other and/or the controller 16. Indeed, the controller 16 may be representative of a controller for a particular device (e.g., an airflow sensor) or a master controller.

The embodiments illustrated and described with respect to FIG. 1 and FIG. 2 represent components of and provide context for embodiments of the present disclosure. While certain HVAC systems are illustrated, present embodiments may be incorporated into any of various systems. For example, as will be discussed in more detail below, a control system in accordance with present embodiments may be implemented in an HVAC system that employs various different control devices 16 from varying suppliers that utilize varying different communication protocols. While avoiding addition of a layer of protection that can coordinate with such a variety of communication protocols, present embodiments may provide a protection scheme that can operate securely without native security in a manner that facilitates coordination within a system with varying communication protocols. This is partly done by employing a write access control using limited inputs associated with one or two initially available write accessible registers (e.g., a register or set of registers for the reset command and/or the passcode).

Figure 3:
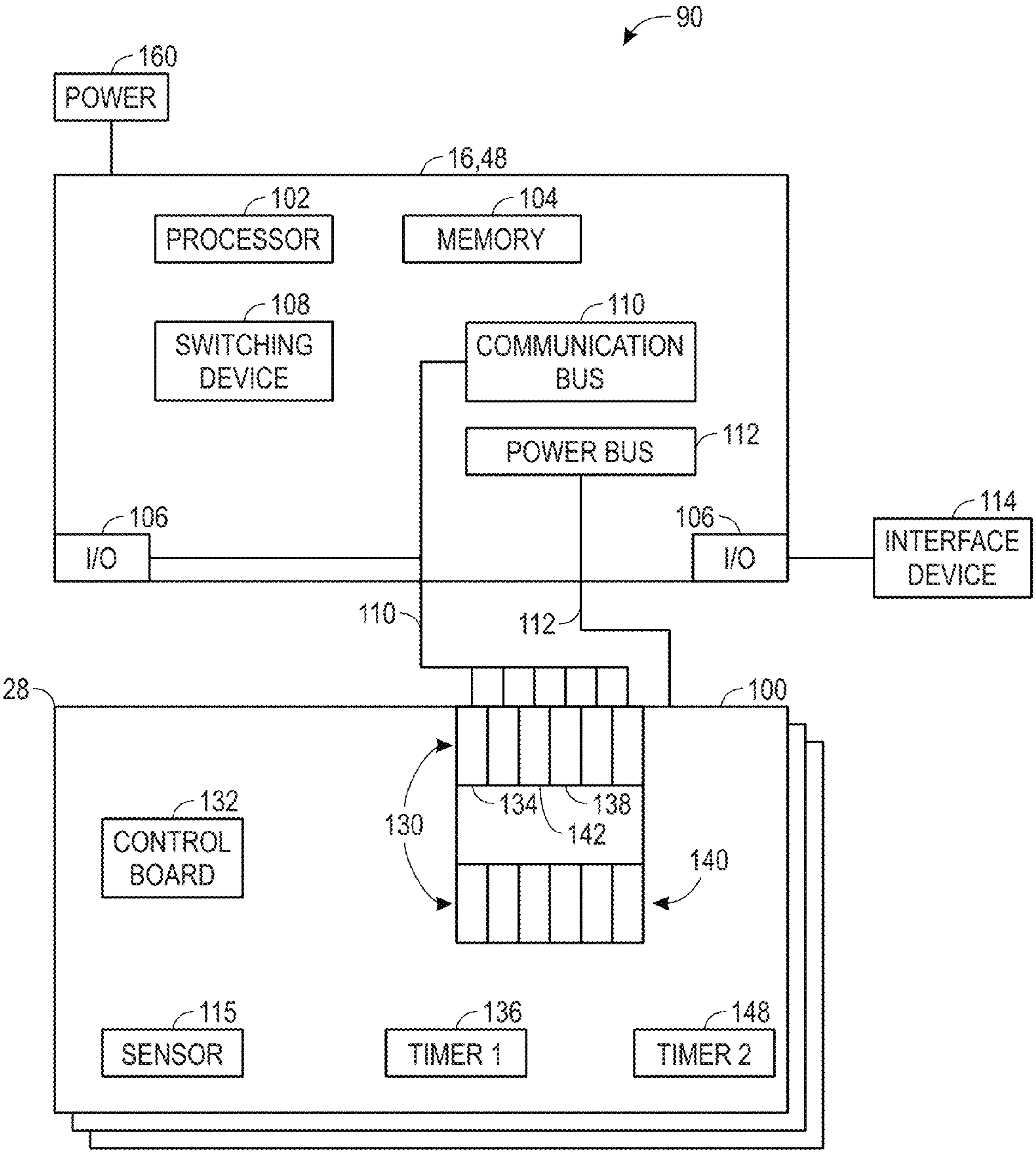
FIG. 3 is a block diagram of a control system in accordance with an embodiment of the present disclosure.

FIG. 3 is a schematic diagram of an HVAC system 90 including the controller 16 communicatively coupled with a controlled device 100 of the HVAC system 90, in accordance with an embodiment of the present disclosure. The controller 16 may represent a computer, an industrial controller (e.g., a programmable logic controller), a smart device (e.g., a smart phone, tablet computer), or the like. In the illustrated embodiment, the controller 16 is represented by the control board 48, which includes a processor 102 (e.g., a microprocessor), a memory 104 (e.g., a non-volatile memory, hard disk, or other computer memory), one or more input/output (I/O) ports 106, switching devices 108 (e.g., relays), a communication bus 110 (which may represent multiple buses), and a power bus 112 (which may represent multiple buses).

The controller 16 may provide and communicate control commands instructing the device 100 (also referred to herein as HVAC equipment), such as a variable speed drive or an air measurement device, to perform a control action, such as adjust a speed of a motor or increase an area value used in a thermal dispersion calculation. The controller 16 may determine control commands based on user inputs received from an interface device 114 and/or operational parameters, such as speed, temperature, and/or pressure, indicated by the device 100, such as a sensor 115 or other controller 16 of the device 100 (e.g., a device controller). The device 100, the controller 16, and the interface device 114 may each communicate using a communication protocol that blocks write access to the device 100 unless the procedures discussed above and elaborated on below are followed.

To facilitate controlling operation of the HVAC system 90, the control board 48 may include the one or more I/O ports 106, which may enable the control board 48 to communicatively couple to the interface device 114, another control board 48, and/or the device 100 via the communication bus 110, which represents one or more communication busses. In some embodiments, the communication bus 110 may include one or more off-board connections, such as wires and/or cables. However, the communication bus 110 may also represent wireless communication and the I/O ports 106 may include wireless transmitters and/or receivers. Additionally, the I/O ports 106 may communicatively couple to the processor 102 and/or the memory 104 via internal or on-board pathways. In such an embodiment, the communication bus 110 represents an internal bus. In some embodiments, the communication bus 110 may include one or more on-board connections, such as printed circuit board traces.

To facilitate controlling operation of such a device 100 (which may represent multiple devices), one or more of the I/O ports 106 on the control board 48 may facilitate conducting electrical signals to the device 100 (e.g., HVAC equipment) via the communication bus 110. Such signals may be provided from the controller 16 (e.g., a master controller using MODBUS RTU) to the device 100 to program or revise information on the device 100 (e.g., a temperature measurement device). For example, registers 130 (e.g., data holding places) of the HVAC equipment 116 may be written to by the controller 16. The registers 130 (e.g., 16-bit registers and/or a binary coils) may be resident on a control board 132 of the device 100 and may operate to store instructions, storage addresses, names, or any kind of data. Such data may be written to individual registers or subsets of these registers 130 by the controller 16, when allowed by the device 100 to have write access. Indeed, write access to certain of the registers 130 (e.g., coils and holding registers) of the device 100 may be blocked until an access protocol is properly performed. By selectively blocking write access in this way, present embodiments provide security. As part of the associated protocol, the device 100 may require receipt of a passcode, such as a map access key, that must be received within a certain time period from a reset of the device 100 to allow write access to certain of the registers 130. The received passcode will have to match a stored passcode that resides in a register or set of registers (e.g., a register map or table or registers) for this initial phase of the protocol to be met. The stored passcode may include all or part of a serial number and/or manufacture date assigned to the specific device 100 or it may include any assembly of alphanumeric or symbolic characters. For example, an air measurement device may have a serial number of 110 and a manufacture date of Apr. 5, 2022 and the passcode may be assigned accordingly as 110040522.

To allow for initiation of the protocol, the device 100 must be capable of receiving a reset command. Accordingly, at least one register, a reset register 134 of the registers 130 is write accessible prior to completion of the write access protocol. This reset register 134, which may be designated as always writeable, is operable to receive the reset command (e.g., from the controller 16) and reset the device 100 in response to such receipt. After the reset, a timer 136 is initiated and another register, a passcode register 138, is monitored for a passcode. In an embodiment, the passcode register 138 may be only be write accessible for a period of time (e.g., the time period set by the timer 136 or another timer) after the reset of the device 100. In another embodiment, the passcode register 138 may be write accessible without requiring the reset of the device 100. Even entering a proper passcode outside of an allowed time after the reset will not grant write access to a subset 140 of the registers 130 that are protected from such access without authorization. Entry of data in the passcode register 138 signals the device 100 to check the passcode entered into the passcode register 138 against an authentication passcode in an authentication register 142 of the device 100. When a passcode is entered within the allotted time period (set by the timer 136) and matches the authentication passcode stored in the authentication register 142, the device 100 may enable write access to the subset 140 of the registers 130 that were previously being protected from unauthorized write access. It should be noted that the authentication passcode stored on the device 100 is prevented from being displayed or read from the device 100 to avoid unauthorized access. If the controller 16 or any controller attempts to read the authentication register 142 (e.g., as part of an inauthentic access attempt), the device 100 will return inaccurate information (e.g., a zero or a series of zeros), hide the data, or simply not respond. That said, other registers (even when not writable) will be capable of being read. For example, registers storing measurement data (e.g., airflow, temperature, sensor status) may be readily read by the controller 16 without authentication.

Once write access is enabled, the timer 136 or an additional timer 148 may be initiated to provide a limited amount of time to enter and save any changes. In an embodiment, the same timer (e.g., timer 136) could set a time period for not only receiving the required passcode but also entering and saving any changes. By using the single timer 136 in this way, additional time would be required relative to simply providing time for entering the passcode and providing a separate time for entering changes. Regardless, once the second time period (e.g., the time remaining from the first timer 136 or the time set by the second timer 148) is expired without saving changes, the changes will be discarded and the last saved settings will be implemented. To save prior to the timer period expiring, the device 100 must be reset again (e.g., via instructions to the reset register 134 from the controller 16). That is, if write access has been granted, changes have been made, and a reset is initiated prior to the time for entering and saving changes is expired, the changes will be implemented after this second reset. The time period set for requiring a reset for implementation acts as a way for the user to confirm saving their settings or discard them by letting the timer expire. Further, if the user leaves the system open to allow writing and a separate unwanted user writes unwanted values, it will revert when the relevant timer expires as a way of discarding the unwanted values.

The device 100 (e.g., a temperature measurement device) may operate using electrical power received from the controller 16. Thus, to facilitate controlling operation of the device 100, one or more of the I/O ports 106 on the control board 48 may also facilitate conducting electrical power (e.g., 24VAC) from power sources 160 to the device via the one or more power busses 112. For example, the control board 48 may receive electrical power from a power source 160, such as a transformer (e.g., an indoor transformer and/or an outdoor transformer), and/or another control board 48 via external power buses 112 coupled to an I/O port 106. In some embodiments, an external power bus 112 may include one or more off-board connections. Additionally, the control board 48 may output electrical power to other devices (e.g., separate HVAC equipment) and/or another control board 48 via additional external power buses 112 coupled to its I/O ports 106.

In accordance with an embodiment of the present disclosure, enabling write access to certain protected registers (e.g., register 140) of the device 100 requires a reset of the device 100 followed by a passcode (e.g., a device-specific access key) being written to the device 100 within an arbitrarily approved time frame (which may be referred to as Timer 1 or the time set by timer 136) after a reset of the device 100. Once a passcode is written to the device 100 (e.g., via a designated write accessible register for receiving the passcode, such as register 138) and the passcode is confirmed to match a stored reference passcode for comparison (an authentication passcode), the user is allowed to write configuration changes to previously write protected registers of the HVAC equipment during a separate arbitrarily approved time frame (which may be referred to as Timer 2 or the time set by timer 148). To save configuration changes a reset of the HVAC equipment is required. If a reset is not performed within Timer 2, the configuration changes revert to the previously stored configuration prior to write access being enabled.

Figure 4:
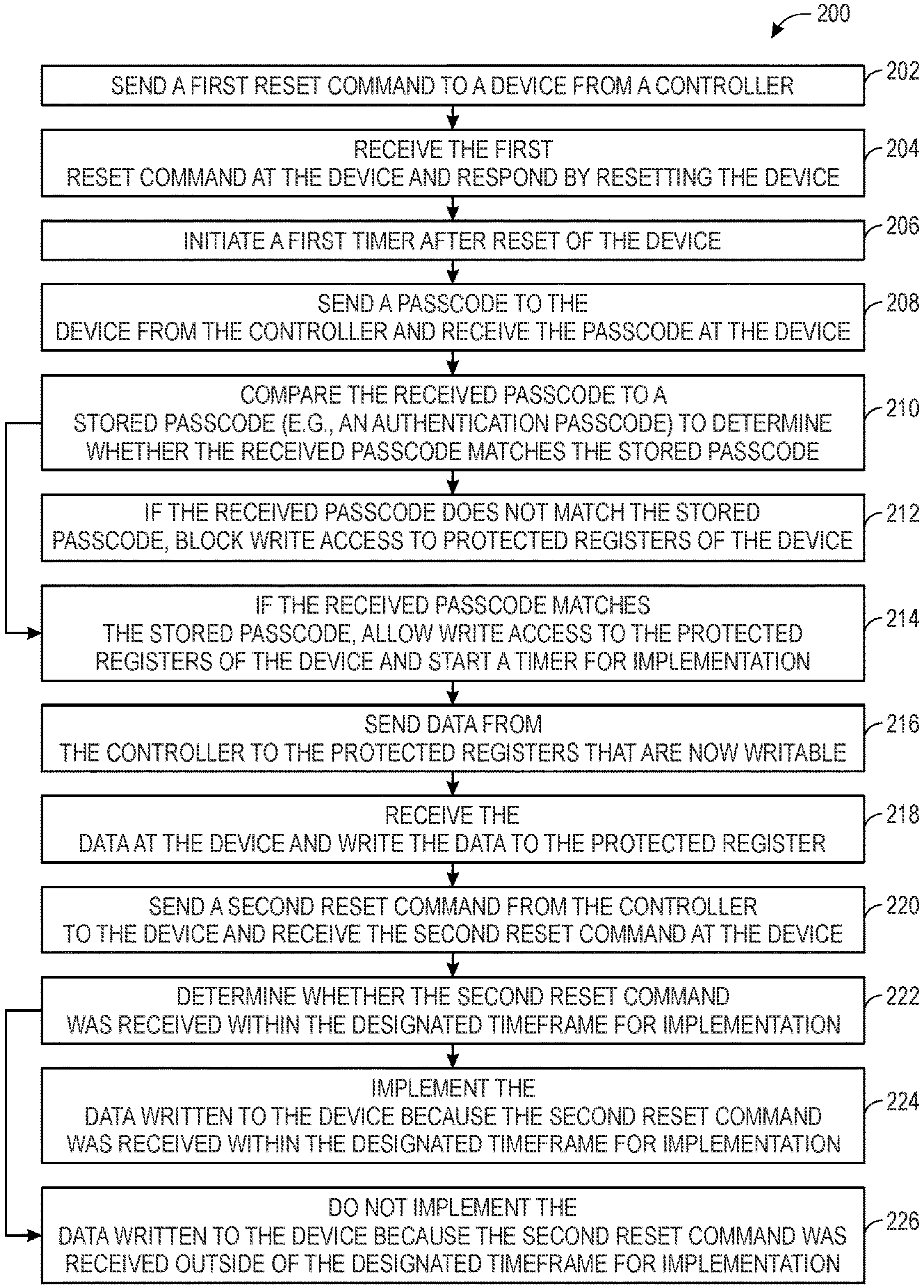
FIG. 4 is a flow diagram of a method of performing aspects of a communication security protocol in accordance with an embodiment of the present disclosure.

FIG. 4 is a process flow diagram of a protocol or method 200 in accordance with present embodiments. The method begins at block 202 with a controller sending a device (e.g., HVAC equipment such as an airflow measurement device) a reset command to a writable register of the device. At block 204, the device receives the reset command and responds by resetting the device. After the reset, a passcode (e.g., a map access key) must be written to a passcode register of the device by the controller within a timeframe from the rest (e.g., within 2 minutes of the device receiving the reset command, within 1 minute of the device resetting. within 30 seconds of initiating the reset). The passcode register may only be writable for a period of time after a reset or may always be designated as writable when the device is functioning. At block 206, a timer is initiated after the reset of the device (e.g., after the device has started up again). At block 208, the controller sends a passcode to the device and the device receives it (e.g., into a passcode register). At block 210 the passcode received from the controller into the passcode register of the device is compared to a stored passcode (an authentication passcode). If the received passcode code does not match the stored passcode, the device will block (continue to block) write access to protected registers of the device, as indicated by block 212. If the received passcode matches the stored passcode, the device will allow write access to protected registers (e.g., coil and holding registers) of the device and initiate a timer for implementation (in some embodiments, the timer for implementation may be initiated at reset), as indicated by block 214. After write access is granted, the controller may send data (e.g., device configuration data) to the protected registers that are now write accessible (e.g., a certain set of registers of the device). Block 216 represents the controller sending the data to the device and block 218 represents the device writing the data to the designated registers. Once the data has been written, a reset must occur within a timeframe (e.g., as set by the timer initiated at block 214) to be implemented. Accordingly, block 220 represents the controller sending a reset command and the device receiving (e.g., at the same register that received the reset command to initiate the protocol) the reset command. A determination is then made at block 222 as to whether the reset command was received within the designated timeframe for implementation. This is followed by block 224 or block 226. Block 224 represents implementing the data sent by the controller in block 216 and written to the device in block 218 when the reset occurred within the timeframe for implementation. If the designated timeframe (e.g., 30 minutes from being granted write access) has elapsed before the reset command is received, the written data will not be implemented and the device will reset to its last saved state, as represented by block 226. In the illustrated embodiment of the method 200, block 226 also represents reverting to the previously saved state because the reset after being granted write access occurred outside of the designated timeframe.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A heating, ventilation, and/or air-conditioning (HVAC) control system, comprising:
- a controller; and
- a device communicatively coupled to the controller and configured to implement an engagement protocol, wherein to grant the controller write access to protected registers of the device the engagement protocol is configured to require:
  - receiving a reset command from the controller at a reset register of the device;
  - receiving a passcode from the controller at a passcode register of the device within a timeframe defined by a timer; and
  - matching the passcode received at the passcode register to an authentication passcode within the timeframe, wherein the authentication passcode is stored in an authentication register of the device, and the authentication register is inaccessible to the controller.

2. The HVAC control system of claim 1, wherein the timeframe is measured from a completed reset of the device.

3. The HVAC control system of claim 1, wherein the device is configured to implement an implementation protocol, wherein:
- to implement changes written to the protected registers of the device after the write access has been granted due to performance of the engagement protocol, the implementation protocol is configured to require receiving an additional reset command at the reset register or a different reset register within an additional timeframe defined by the timer or an additional timer.

4. The HVAC control system of claim 3, wherein the device comprises HVAC equipment having a control board that maintains the passcode register as writable whether the protected registers are writable or not.

5. The HVAC control system of claim 1, wherein to grant the controller the write access to the protected registers of the device the engagement protocol is configured to require the device to complete a reset in response to the reset command.

6. The HVAC control system of claim 1, wherein the engagement protocol is configured to block the write access by maintaining a default and not actively granting the write access.

7. The HVAC control system of claim 1, wherein the engagement protocol is configured to block the write access when the passcode is not received at the passcode register and matched with the authentication passcode within an additional timeframe.

8. The HVAC control system of claim 7, wherein the additional timeframe is measured from a completed reset of the device.

9. The HVAC control system of claim 1, wherein the device comprises an air measurement device.

10. The HVAC control system of claim 9, wherein the air measurement device includes the reset register, the passcode register, and the protected registers, and wherein the protected registers are configured to store operational data for the air measurement device.

11. The HVAC control system of claim 1, wherein the controller comprises a master control board and the device comprises a sensor communicatively coupled to a device control board.

12. The HVAC control system of claim 3, wherein at least a subset of the protected registers are readable by the controller without performing the engagement protocol or the implementation protocol.

13. A tangible, non-transitory, computer-readable medium storing instructions that, when executed by one or more processors, cause the one or more processors to implement an engagement protocol, wherein to grant a controller write access to protected registers of a device, the engagement protocol is configured to require:

receiving a reset command from the controller at a reset register of the device;

receiving a passcode from the controller at a passcode register of the device within a timeframe defined by a timer; and matching the passcode received at the passcode register to an authentication passcode within the time frame, wherein the authentication passcode is stored in an authentication register of the device, and the authentication register is inaccessible to the controller.

14. The tangible, non-transitory, computer-readable medium of claim 13 storing the instructions that, when executed by one or more processors, cause the one or more processors to implement an implementation protocol, wherein:

to implement changes written to the protected registers of the device after the write access has been granted due to performance of the engagement protocol, the implementation protocol is configured to require receiving an additional reset command at the reset register within an additional timeframe defined by the timer or an additional timer.

15. The tangible, non-transitory, computer-readable medium of claim 13 storing the instructions that, when executed by one or more processors, cause the one or more processors to require the device to complete a reset in response to the reset command before granting the controller the write access to the protected registers of the device.

16. The tangible, non-transitory, computer-readable medium of claim 13 storing the instructions that, when executed by one or more processors, cause the one or more processors to block the write access when the passcode received at the passcode register does not match the authentication passcode.

17. A method of operating a heating, ventilation, and air-conditioning (HVAC) control system, comprising:

performing an engagement protocol to control write access to protected registers of a device, wherein operation of the engagement protocol comprises blocking write access to the protected registers until after:

receiving a reset command at a reset register of the device;

completing a reset of the device in response to the reset command;

after completing the reset, receiving a passcode at a passcode register of the device within a timeframe defined by a timer, and matching the passcode received at the passcode register to an authentication passcode within the timeframe, wherein the authentication passcode is stored in an authentication register of the device, and the authentication register is inaccessible to the controller.

18. The method of claim 17, comprising performing an implementation protocol to implement changes written to the protected registers of the device after the write access has been granted due to performance of the engagement protocol, wherein the implementation protocol includes receiving an additional reset command at the reset register within an additional timeframe defined by the timer or an additional timer.

19. The method of claim 17, comprising receiving updated write data into the protected registers and implementing previously saved write data after a time period due to lack of an additional reset of the device within the timer period.

* * * * *